United States Patent
Canning

(10) Patent No.: US 8,656,534 B2
(45) Date of Patent: Feb. 25, 2014

(54) HOUSEHOLD BED COVERING FOR FAMILIES WITH PETS

(75) Inventor: Jeffrey E. Canning, Arlington, VT (US)

(73) Assignee: The Orvis Company, Inc., Sunderland, VT (US)

( * ) Notice: Subject to any disclaimer, the term of this patent is extended or adjusted under 35 U.S.C. 154(b) by 963 days.

(21) Appl. No.: 11/679,399

(22) Filed: Feb. 27, 2007

(65) Prior Publication Data

US 2008/0201845 A1    Aug. 28, 2008

(51) Int. Cl.
*A47D 15/00* (2006.01)

(52) U.S. Cl.
USPC .................................. 5/484; 5/501

(58) Field of Classification Search
USPC ..................... 5/484, 501; 119/28.5
See application file for complete search history.

(56) References Cited

U.S. PATENT DOCUMENTS

| | | |
|---|---|---|
| 3,953,566 A | 4/1976 | Gore |
| 4,187,390 A | 2/1980 | Gore |
| 4,194,041 A | 3/1980 | Gore et al. |
| 4,942,214 A | 7/1990 | Sakhpara |
| 5,243,725 A * | 9/1993 | Fowler .............................. 5/502 |
| 5,308,689 A * | 5/1994 | Shinkai et al. .................. 442/76 |
| 5,685,257 A * | 11/1997 | Feibus ......................... 119/28.5 |
| 6,274,520 B1 * | 8/2001 | Cordell ........................ 442/381 |

* cited by examiner

*Primary Examiner* — William Kelleher
(74) *Attorney, Agent, or Firm* — Fay Sharpe LLP

(57) ABSTRACT

A laminated bed covering has a puncture resistant outer layer, a waterproof but water vapor permeable central layer and an inner layer, the entire structure protecting the bed and bed clothing from dog claws, pet urine, and pet odors while providing a comfortable sleeping environment to the bed's occupants.

8 Claims, 2 Drawing Sheets

HOUSEHOLD BED COVERING FOR FAMILIES WITH PETS

FIELD OF THE INVENTION

This invention relates to bed clothing and more particularly to multi-layer bed covers for use on sleeping beds in homes.

BACKGROUND OF THE INVENTION

Home sleeping beds often comprise a bed frame, box springs, a mattress, sheets covering the mattress, pillows, pillow cases, blankets and, a bed covering. The bed covering is sometimes a bedspread. The bed covering is, sometimes a quilt or duvet. Many beds are used each night for sleeping. After the occupant completes his or her rest, the bed is "made" with the bed covering completely covering the top surfaces of the mattress and pillows.

The bed covering is often folded back from the pillows and left on the bed to act as an additional blanket when a person or persons sleeps in the bed.

Many households include pets. These pets are often cats and/or dogs. Some cats and dogs sleep on the bed of their human companion. Pets often sleep on the bed when the bed is vacant and made. Pets often sleep on the bed when the bed is occupied by a human.

Household pets sometimes create issues and problems with respect to their sleeping areas. Pets sometimes come in from outdoors wet and proceed directly to their sleeping area. Pets sometimes have "accidents" dirtying the bed and bed clothes with urine. Pets sometimes drool. Pets shed hair, fur and skin dander. Pets perspire. Pets carry odors into their sleeping area, sometimes their own, sometimes odors they pick up out of doors. Pets sometimes have sharp claws and sometimes sleep actively.

SUMMARY OF THE INVENTION

The present invention provides a bed covering of multiple layers which protects the bed elements including other bed coverings from household pets and the residue of household pets sleeping on the bed while still providing a comfortable environment for the human occupant of the bed and bedroom.

In accordance with the present invention, a bed covering adapted to protect a sleeping bed from household pets is provided having an inner layer having a soft hand feel, a waterproof and breathable central layer permitting the transit of water vapor but preventing the transit of liquid water, and, an outer layer having a soft hand feel and being puncture resistant.

Further in accordance with the invention, the bed covering is washable in water-based domestic type washing machines and dryable in domestic dryers.

Yet further in accordance with the invention, the bed covering outer layer is a high thread count fabric.

Still further in accordance with the invention, the bed covering inner layer and the bed covering outer layer both allow the transit of liquid water through them.

Still further in accordance with the present invention, the bed covering inner layer is a fabric having at least some cotton content and the bed covering outer layer is a fabric having at least some cotton content.

Yet further in accordance with the invention, the bed covering central layer is a breathable waterproof layer.

Further in accordance with the invention, the bed covering outer layer is a fabric layer with a thread count of at least 150 threads per inch and is snag resistant.

It is a principal object of the present invention to provide a bed covering having a soft hand feel on both the inner surface and outer surface, which is waterproof but permeable to water vapor and which is machine washable.

It is a further object of the present invention to provide a bed covering which will isolate the liquids associated with sleeping dogs or otherwise spilled onto the bed covering from the rest of the bed clothes and the bed itself.

It is a further object of the present invention to provide a bed covering which will isolate the odors, fur, dander, and hair shed by the pet from the other bed coverings and bed elements.

It is still another object of the present invention to provide a bed covering which is sufficiently breathable to provide a comfortable sleeping environment for a human occupying the bed.

It is still another object of the present invention to provide a bed covering having an inner surface and an outer surface of soft and dry hand feel providing comfortable surfaces for sleeping, sitting and otherwise occupying by both humans and pets.

It is still another object of the present invention to provide a bed covering with an inner surface and an outer surface which can be dyed, patterned, and otherwise made pleasing in visual appearance.

It is still another object of the present invention to provide a bed covering which is waterproof, water vapor permeable, easy to manufacture, easy to cut to specific sizes and shapes, easy to decorate and machine washable.

It is still another object of the present invention to provide a waterproof and water vapor permeable bed covering which is attractive, machine washable and machine dryable.

BRIEF DESCRIPTION OF THE DRAWINGS

The invention may take physical form in certain parts and arrangements of parts, preferred embodiments of which will be described in detail in the specification and illustrated in the accompanying drawings which form a part hereof and wherein.

DESCRIPTION OF THE PREFERRED EMBODIMENTS

Figure 1:
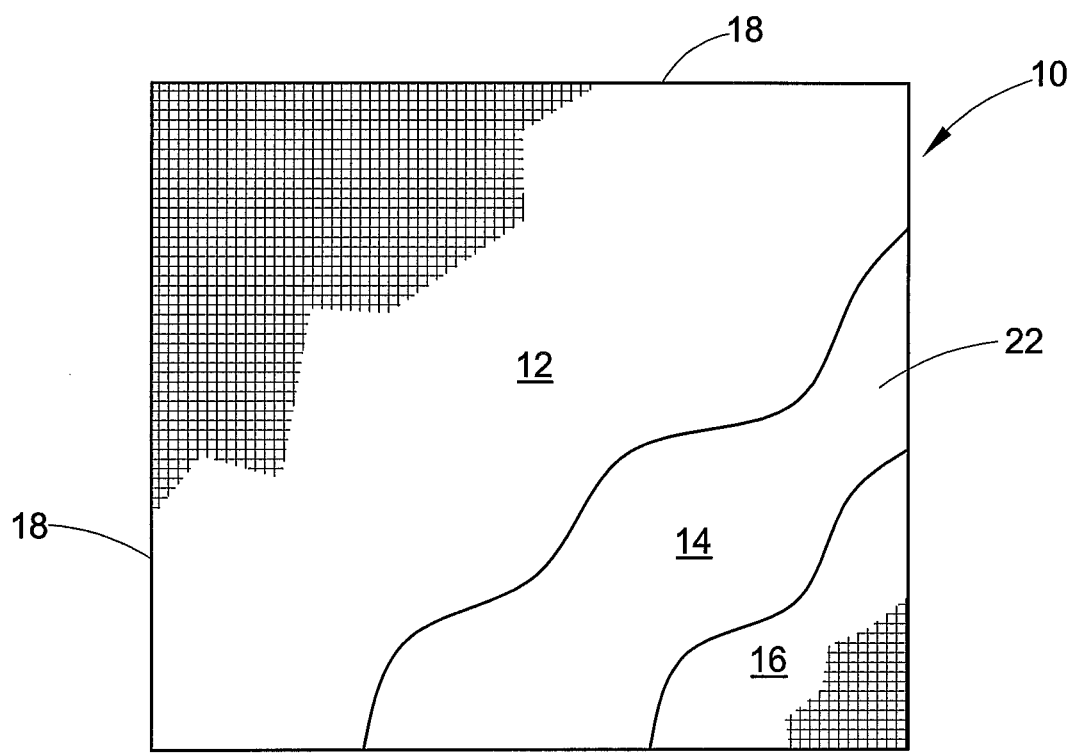
FIG. 1 is a plan view of a bed covering in accordance with the present invention looking at the outer, or top, side with layers partially cut away.

Referring now to the drawings wherein the showings are made for the purposes of illustrating preferred embodiments of the invention only and not for the purposes of limiting same, FIG. 1 shows a bed covering 10 comprising an outer or top layer 12, a central layer 14 and an inner or bottom layer 16. The three layers are laminated together by means of a laminating adhesive or the like. The edges 18 are hemmed in any conventional manner to provide an attractive finish. The bed covering 10 has lateral dimensions of various conventional sizes to be used with single beds, double beds, queen size beds and king size beds.

The outer or top layer 12 is a conventional woven fabric in construction. The outer layer 12 is preferably a high thread count pure cotton or cotton blend fabric. Preferably, the thread count is at least 150 threads per inch. Thread count is the total number of threads in both the warp direction and the fill direction forming a fabric. In the most preferred embodiment, the thread count is 330 threads per inch and the fabric is 100% cotton. The outer or top layer 12 is resistant to snagging, has a good hand feel and is washable. The outer layer 12 allows the passage of both water vapor and liquid water. A plain weave is important in maintaining snag resistance and is used in the preferred embodiment.

Figure 2:
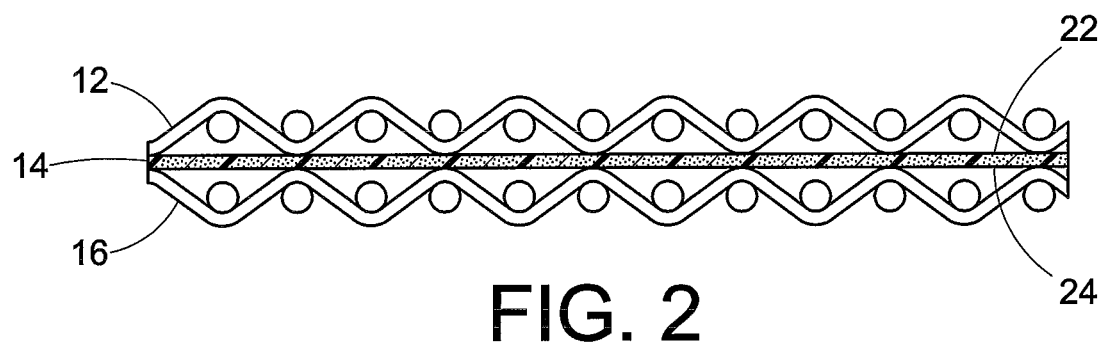
FIG. 2 is a cross section of a portion of the bed covering seen in FIG. 1.

Snap resistant fabrics are commercially available. a simple weave, such as the plain weave seen in FIG. 2, helps with snag resistance. A plain weave is created by having fill thread go over one weft thread and under the next thread repeatedly. The next fill thread goes over the weft threads it neighbor went under and under the weft threads its neighbor went over. A simple, tight weave can be achieved which aids in snag resistance. A high thread count also aids in achieving a tight weave and snag resistance.

A cotton or cotton blend fabric is selected to give a soft, dry, non-slick hand feel.

The central layer 14 has an outer face 22 facing the outer or top layer 12 and an inner face 24 facing the inner or bottom layer 16. The central layer 14 is a waterproof, breathable layer. The central layer 14 prevents the flow of water from its outer face 22 through its body to its inner face 24. The central layer 14 allows the flow of water vapor from the outer face 22 through the body of the layer to the inner face 24 and also allows the flow of water vapor from the inner face 24 to the outer face 22. Several different materials are available having these characteristics. However, the constraints of making the finished product home machine washable and dryable, making the finished product manufacturable by lamination, and making the finished product sufficiently breathable and waterproof to form a bed covering are significant. Applicant has found that water vapor permeable synthetic polymer film materials, preferably, a fluoro polymer film are appropriate for use as the central layer 14. An expanded polytetrafluoroethylene film is most preferable. Expanded polytetrafluoroethylene films are available from several companies as commercial products.

The inner or bottom layer 16 is another fabric layer. The inner or bottom layer 16 can be identical to the outer or top layer 12 or the inner or bottom layer 16 can have a lower thread count, different weave and a different composition. In the preferred embodiment, the inner layer 16 is a cotton polyester blend which provides water vapor permeability, and good hand feel.

The outer layer 12, the central layer 14, and the inner layer 16 are laminated together by laminating glue or other conventional means. The edges 18 are dressed by hemming or the like providing a finished bed covering 10.

The outer layer 12 is normally dyed or printed to provide a pleasing appearance. The inner layer 16 is often dyed or printed to provide a pleasing appearance as well. The outer layer 12 and the inner layer 16 protect the central layer 14 from abrasion, piercing or snagging.

The bed covering 10 as described is used by the consumer as a conventional bedspread. It covers the entire bed during the day providing a pleasing appearance and protects the bed from spills, and liquids, odors, and shedding from pets. The bed covering 10 protects the bed and other bed clothes from pet odor, from pet urine, from pet dander, from pet hair, from pet fur and other contaminants. Moreover, at night, the bed covering 10 provides a pleasing sleeping environment. The human occupant of the bed, positioned below the sheets, blankets and bed covering 10 needs an environment that allows the passage of water vapor away from the sleeping space. People perspire while in bed. Perspiration contains water vapor. This water vapor must escape. Some people sleep with the covers over their heads and the water vapor contained in exhaled air must escape. If bed coverings are not sufficiently breathable, the bed coverings will become wet and/or clammy and the sleeping environment uncomfortable. The bed covering 10 of the present invention allows for the passage of water vapor through the bed covering so that a pleasant sleeping environment is provided.

When the bed covering 10 becomes soiled, wet or discolored, it may be removed from the bed and washed in a regular household water-based washing machine. Following washing, the bed covering 10 is machine dryable.

Because the outer or top layer 12 is constructed of high thread count fabric in a simple weave, preferably, cotton, it is resistant to snagging by pet claws and will have a long usable life.

Alternative materials for use in the central layer 14 include polymer-encapsulated cotton, wax impregnated closely woven cotton or cotton polyester mixes, or other fabrics or membranes allowing the passage of water vapor but preventing the passage of liquid water. However, such materials are not preferred. Some positive characteristics, such as machine washability and dryability may be lost by use of other central layer materials.

Figure 3:
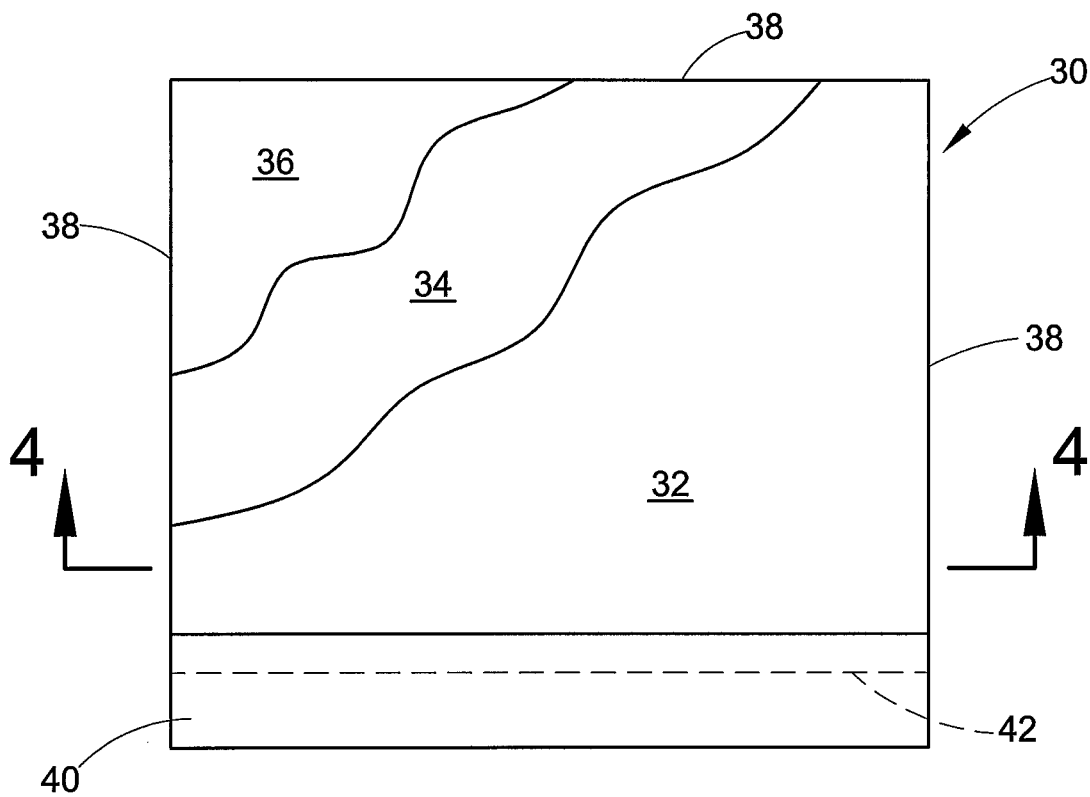
FIG. 3 is a plan view of a second embodiment of the invention with layers partially cut away; and, FIG. 4 is a cross section of the embodiment of the invention seen in FIG. 3 taken along line 4-4.
Figure 4:
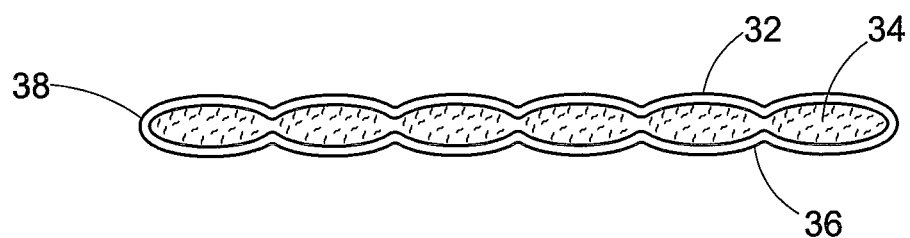

A second embodiment of the invention is illustrated in FIGS. 3 and 4. Referring now to FIG. 3 an envelope 30 comprises an outer or top sheet 32, a central insulator 34, an inner or bottom sheet 36 and a flap 40. The outer sheet 32 and the inner sheet 36 are bonded to one another by seaming or other means around most of their edges 38. One edge of the top sheet 32 is not bonded to the bottom sheet 36. Rather, the flap 40 is bonded to the edge of the bottom sheet 36 and overlays the unbonded edge of the top sheet 32. The flap 40 is bonded to the bottom sheet 32 along one entire edge of the bottom sheet 32 and a short length of the two adjacent edges. This provides a protected internal volume in which a central insulator 34 may be removable contained. The central insulator 34 in the preferred embodiment is a quilt. Moreover, a down comforter or blanket or other element may be placed in the envelope 30 as desired by the consumer. In this embodiment of the invention, at least the outer or top sheet 32 is constructed in the same manner as the bed covering 10. That is, the outer or top sheet 32 comprises an outer or top layer 12, a central layer 14 and an inner or bottom layer 16 having the characteristics described above with respect to the first embodiment. In the preferred embodiment, the outer sheet 32, the inner sheet 36 and the flap 40 are all constructed in a manner identical to the bed covering 10 providing complete protection for the central insulator element 34 and the bed clothes and bed in general. Alternatively, only the outer or top sheet 32 is constructed identically to the bed covering 10 and the inner sheet and flap 40 are constructed from a cotton or cotton blend fabric.

In the preferred embodiment, the unconnected edge 42 of the top sheet 32 is concealed by the flap 40 which overlays it. This provides access to the central insulator 34 while still protecting the central insulator from liquids. Alternatively, the flap 40 and top sheet 32 can be joined by means of a zipper, buttons or other fasteners. Further in the alternative, the flap 40 may be deleted in its entirety and the top sheet joined to the bottom sheet 36 along one edge by means of a zipper or otherwise. Still further in the alternative, a washable central insulator 34 can be sandwiched between a top sheet 32 and a bottom sheet 36 which are joined around their entire periphery making a permanently assembled bed covering envelope 30.

The invention has been described with reference to preferred embodiments. Obviously, modifications and alterations will occur to others upon the reading and understanding of this specification and it is intended to include such modifications and alterations which come within the scope of the claims hereof or their equivalents.

Having thus described the invention, it is claimed:

1. A waterproof, water-vapor-permeable bed covering for covering a sleeping bed adapted to protect the sleeping bed from household pets, said bed covering comprising at least the following three layers:
    an inner layer being at least partially cotton;
        a waterproof and breathable central layer having an inner face adjacent said inner layer and an outer face, said central layer permitting the transit of water vapor from said inner face to said outer face in a first direction, while preventing the transit of liquid water from said outer face to said inner face in a second direction;
        said central layer is a fluoropolymer layer;
        an outer layer being puncture resistant and at least partially cotton for providing wear resistance to a pet above said outer layer;
        said bed covering being washable in a water based domestic home type washing machine; and,
        wherein said inner layer, said central layer, and said outer layer permit said transit of said water vapor, in said first direction, traveling from an occupant between said sleeping bed and said bed covering, through first said inner, then said central layer, and finally said outer layer.

2. The bed covering of claim 1 wherein said central layer is laminated to said outer layer.

3. The bed covering of claim 1 wherein said outer layer has a thread count of at least 150 threads per square inch.

4. The bed covering of claim 3 wherein said outer layer is a plain weave fabric.

5. The bed covering of claim 4 wherein said outer cover has a thread count of about 330 threads per square inch.

6. The bed covering of claim 1 wherein said central layer is a polytetrafluoroethylene layer.

7. The bed covering of claim 6 wherein said central layer is an expanded polytetrafluoroethylene layer.

8. A waterproof, water-vapor-permeable bed covering for covering a sleeping bed adapted to protect the sleeping bed from household pets, said bed covering comprising at least the following three layers:
    a fabric inner layer being at least partially cotton for providing comfort to an occupant below said inner layer;
    a polytetrafluoroethylene waterproof and breathable central layer having an inner face adjacent said inner layer and an outer face, said central layer simultaneously
    permitting the transit of water vapor from said inner face to said outer face while preventing the transit of liquid water from said outer face to said inner face;
    a fabric outer layer being puncture resistant for providing wear resistance to a pet above said outer layer;
    said bed covering being washable in a water based domestic home type washing machine; and,
    said outer layer is a plain weave fabric containing cotton and having a thread count of at least 150 threads per square inch.

* * * * *